United States Patent
Fan (10) Patent No.: US 6,188,159 B1
(45) Date of Patent: Feb. 13, 2001

(54) STATOR USED FOR DYNAMO OR ELECTROMOTOR

(76) Inventor: Yang-Fung Fan, No. 63, Tung-Yuan Rd., Chung Li Industrial Park, Tao-Yuan (TW)

( * ) Notice: Under 35 U.S.C. 154(b), the term of this patent shall be extended for 0 days.

(21) Appl. No.: 09/411,251

(22) Filed: Oct. 4, 1999

(30) Foreign Application Priority Data

Feb. 12, 1998 (TW) .................................. 87220101

(51) Int. Cl.⁷ .............................. H02K 1/06; H02K 1/12
(52) U.S. Cl. ..................... 310/254; 310/49 R; 310/216; 310/259
(58) Field of Search ............................... 310/216, 254, 310/217, 218, 258, 259, 156, 114; 29/596–598

(56) References Cited

U.S. PATENT DOCUMENTS

| | | | |
|---|---|---|---|
| 1,255,607 | * | 2/1918 | Hensley ............................... 310/254 |
| 3,983,435 | * | 9/1976 | Sims .................................... 310/259 |
| 4,249,099 | * | 2/1981 | Bhongbhibhat et al. ............ 310/261 |
| 4,255,684 | * | 3/1981 | Mischler et al. ..................... 310/216 |
| 5,051,637 | * | 9/1991 | Harris et al. ........................ 310/90.5 |
| 5,365,137 | * | 11/1994 | Richardson et al. ................. 310/258 |
| 5,962,938 | * | 10/1999 | Bobay et al. ...................... 310/67 R |
| 5,994,814 | * | 11/1999 | Kawabata et al. ................... 310/216 |

* cited by examiner

Primary Examiner—Tran Nguyen
(74) Attorney, Agent, or Firm—Bacon & Thomas (57) ABSTRACT

A stator for use in a electro-motor or dynamo, which includes a plurality of stator units and winding means wound round the stator units, the column of each stator unit having a first end section, a second end section, and a middle section, the first end section and the second end section being formed integral with two distal ends of the middle section and turned toward an inner side of the column. The stator units are arranged around a central axis in such a manner that the longitudinal axis of each stator is arranged in parallel or perpendicular to the central axis, or at an angle relative to the central axis.

10 Claims, 9 Drawing Sheets

STATOR USED FOR DYNAMO OR ELECTROMOTOR

BACKGROUND OF THE INVENTION

The present invention relates to a stator, and more particularly to an improved structure of stator for use in a electro-motor or dynamo.

Figure 20:
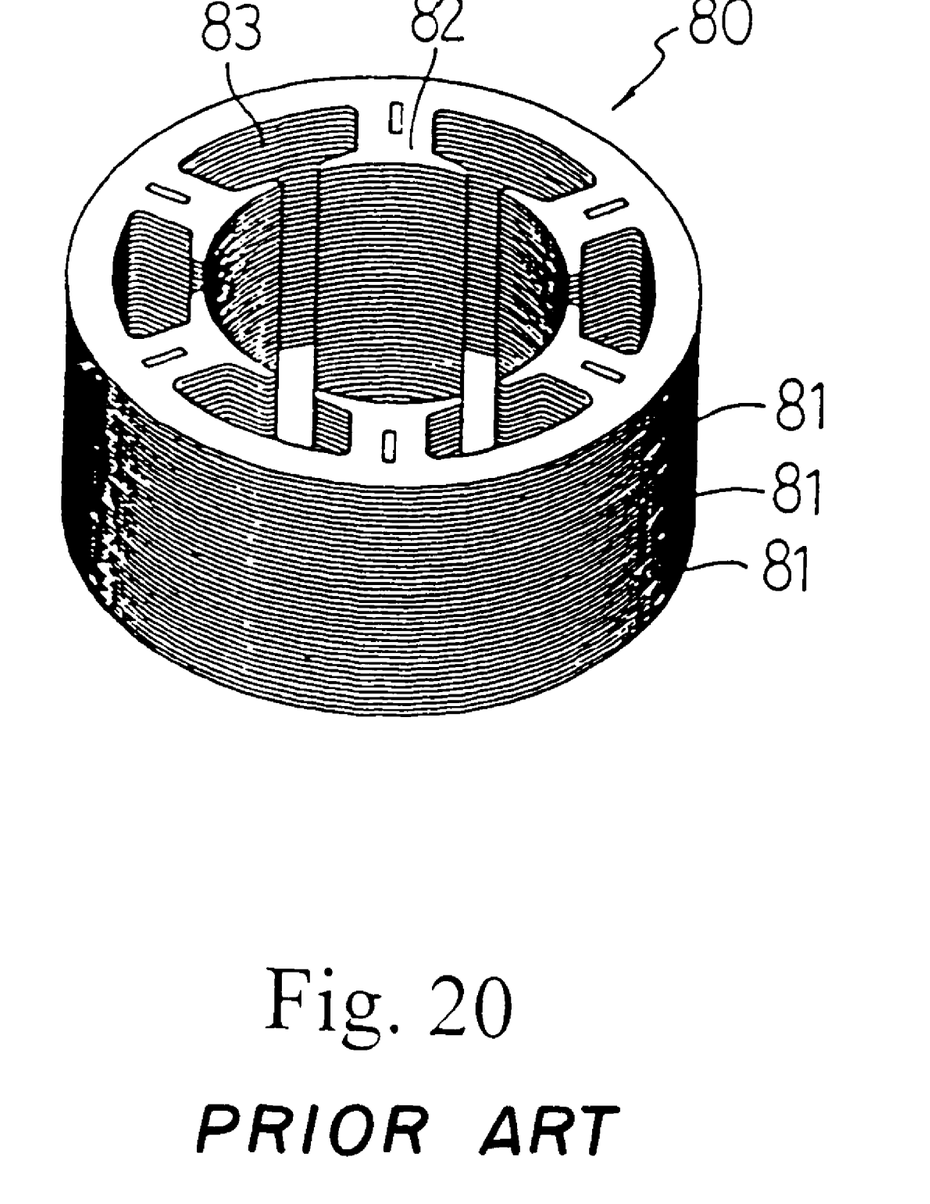
FIG. 20 is a perspective view of a stator according to the prior art.

FIG. 20 shows a stator for use in a electro-motor or dynamo. This structure of stator 80 is comprised of a metal core consisting of a stack of metal plates 81 of thickness about within 0.35 mm~0.5 mm. Each metal plate 81 comprises a plurality of teeth 82 and a plurality of inside notches 83 alternatively arranged on the inside around the circular center opening thereof. This structure of stator 80 wastes lots of metal plate material (the portions at the inside notches 83 and center portion 84), and requires special machines, such as winding machine, shaping machine, and binding machine, etc. for winding the windings on the metal plates 81. When increasing the number of poles (N poles and S poles), the wire winding procedure becomes complicated, and the number of turns of the windings is accordingly reduced.

SUMMARY OF THE INVENTION

It is one object of the present invention to provide a stator, which can be alternatively arranged to fit different design requirements. It is another object of the present invention to provide a stator, which is easy and cost less to manufacture. It is still another object of the present invention to provide a stator, which has independent stator units for easy installation of the windings separately, enabling the windings to be wound round each stator unit in a saturated manner, so as to improve the strength of magnetic field. It is still another object of the present invention to provide a stator, which has multiple stator units arranged at different layers, so that the number of poles (N poles and S poles) can easily be increased without reducing the number of turns of the windings by arranging the stator units in such a manner that a difference of elevation exists in the direction of the longitudinal axis between the stators at each two adjacent layers.

According to the present invention, the stator is comprised of a plurality of stator units. Each stator unit is comprised of a column and winding means wound round the column. The column comprises a first end section, a second end section, and a middle section. The first end section and the second end section are formed integral with two distal ends of the middle section, and turned toward an inner side of the column. The stator units are arranged around a central axis on which the rotor is rotated. The stator units are independent members. The windings are respectively wound round the column of each stator unit. According to different alternate forms of the present invention, the longitudinal axis of each stator can be arranged in parallel or perpendicular to the central axis, or at an angle relative to the central axis. The stator units can be arranged on a plane around the central axis. Alternatively, the stator units can be arranged at different layers and spaced along the central axis, such that a difference of elevation exists between the stators at each two adjacent layers.

DETAILED DESCRIPTION OF THE PREFERRED EMBODIMENT

Figure 1:
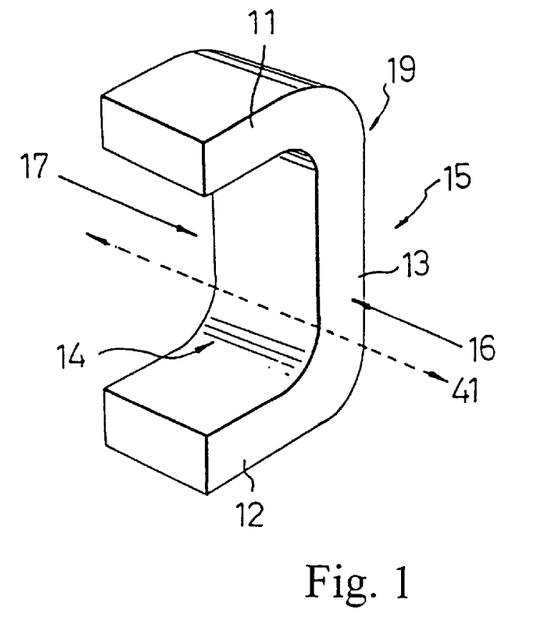
FIG. 1 shows a column for a stator according to the present invention.
Figure 2:
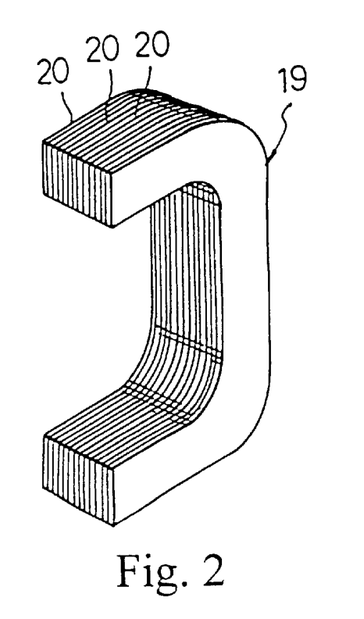
FIG. 2 shows an alternate form of the column for stator according to the present invention.
Figure 3:
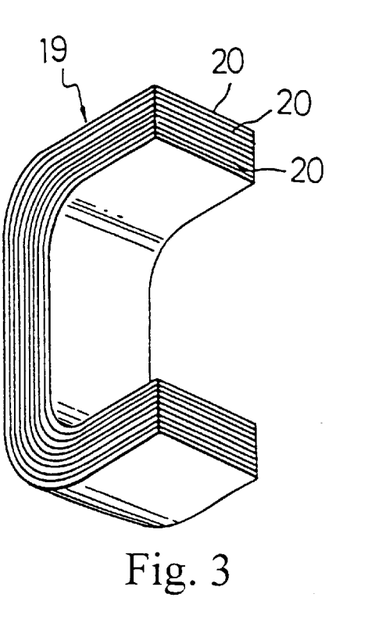
FIG. 3 shows another alternate form of the column for stator according to the present invention.
Figure 4:
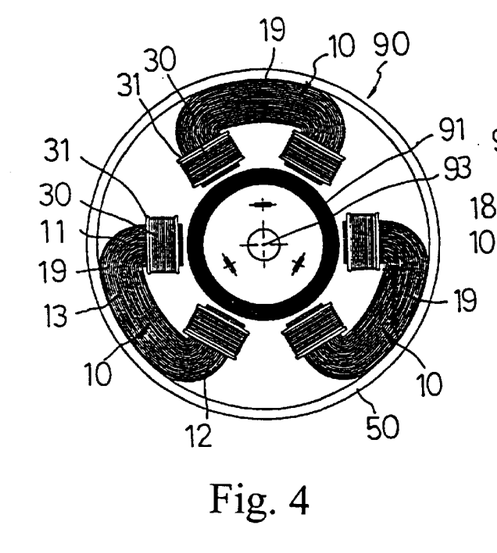
FIG. 4 is a sectional view of a stator according to a first embodiment of the present invention.

Referring to FIG. 4, a stator 90 is shown comprised of three stator units 10. Each stator unit 10 is comprised of a column 19, and a winding 30. The column 19, as shown in FIG. 1, extends longitudinally along a longitudinal axis 41 from a topside 16 toward a bottom side 17, comprising a first end section 11, a second end section 12, and a middle section 13. The first end section 11 and the second end section 12 are respectively formed integral with two distal ends of the middle section 13, and turned toward the inner side 14 of the column 19 (after installation of the winding and connection of electric current to the winding, the first end section 11 and the second end section 12 form the N pole and the S pole respectively). The side opposite to the inner side 14 is the outer side 15. The column 19 is made of magnetically conductive material, for example, powder metal material, or a plurality of magnetically conductive plates 20 arranged in a stack in the direction of the longitudinal axis 41 or from the inner side 14 toward the outer side 15. The magnetically conductive plates 20 can be obtained from steel plates. The winding 30 is made of enameled wire wound round the column 19 through multiple turns over the top side 16, the inner side 14, the bottom side 17, and the outer side 15. Winding holder means 31 is preferably provided at the column 19 to hold the winding 30.

In FIG. 4, the winding 30 of each stator unit 10 is provided at the first end section 11 and the second end section 12, and the stator units 10 are equiangularly spaced around the rotor 91 with the inner side 14 of each stator unit 10 facing the central axis 93 on which the rotor 91 is rotated. This arrangement forms a 6-pole (three N poles and three S poles) stator 90.

Figure 5:
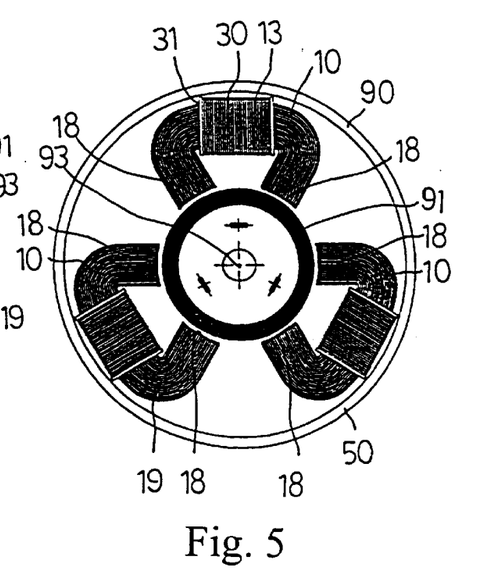
FIG. 5 is a sectional view of a stator according to a second embodiment of the present invention.

FIG. 5 shows an alternate form of the present invention. According to this alternate form, the winding 30 of each stator unit 10 is provided at the middle section 13, and the first end section 11 and second end section 12 of each stator unit 10 each have an end edge 18 smoothed curved inwards for close contact with the rotor 91.

Figure 6:
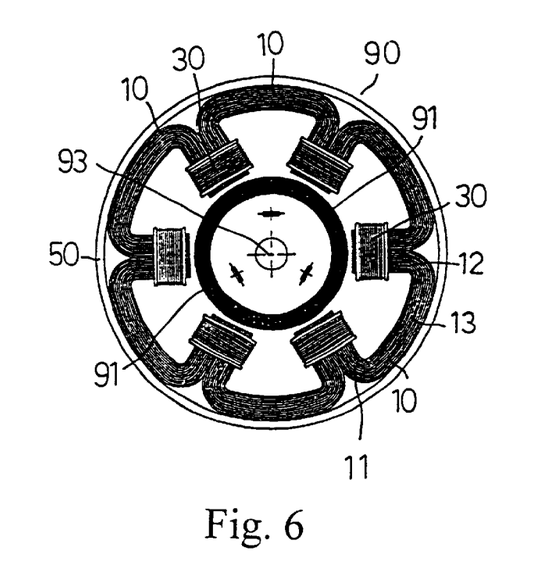
FIG. 6 is a sectional view of a stator according to a third embodiment of the present invention.

FIG. 6 shows another alternate form of the present invention. According to this alternate form, the stator 90 is comprised of six stator units 10, and the windings 30 are respectively fastened to the first end section 11 at the column 19 of one stator unit 10 and the second end section 12 of the column 19 of another stator unit 10.

Figure 7:
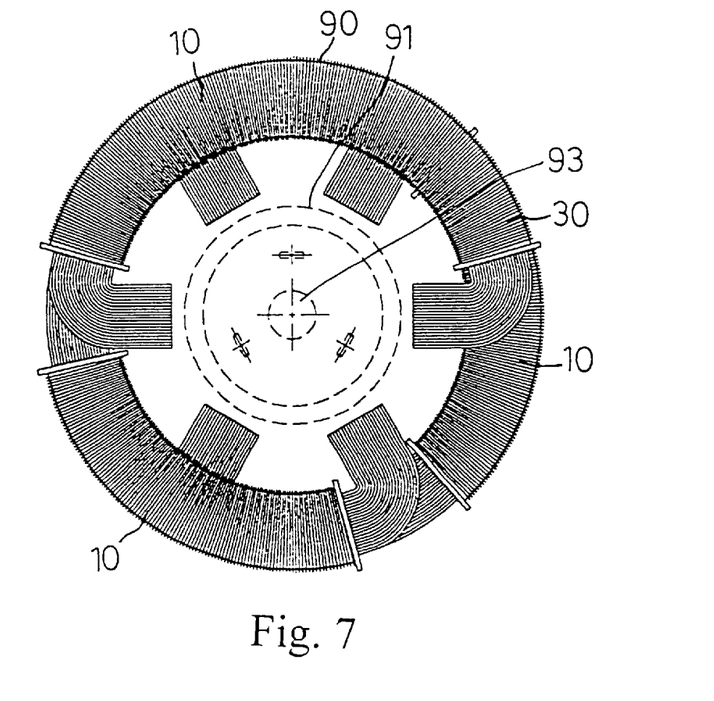
FIG. 7 is a sectional view of a stator according to a fourth embodiment of the present invention.
Figure 8:
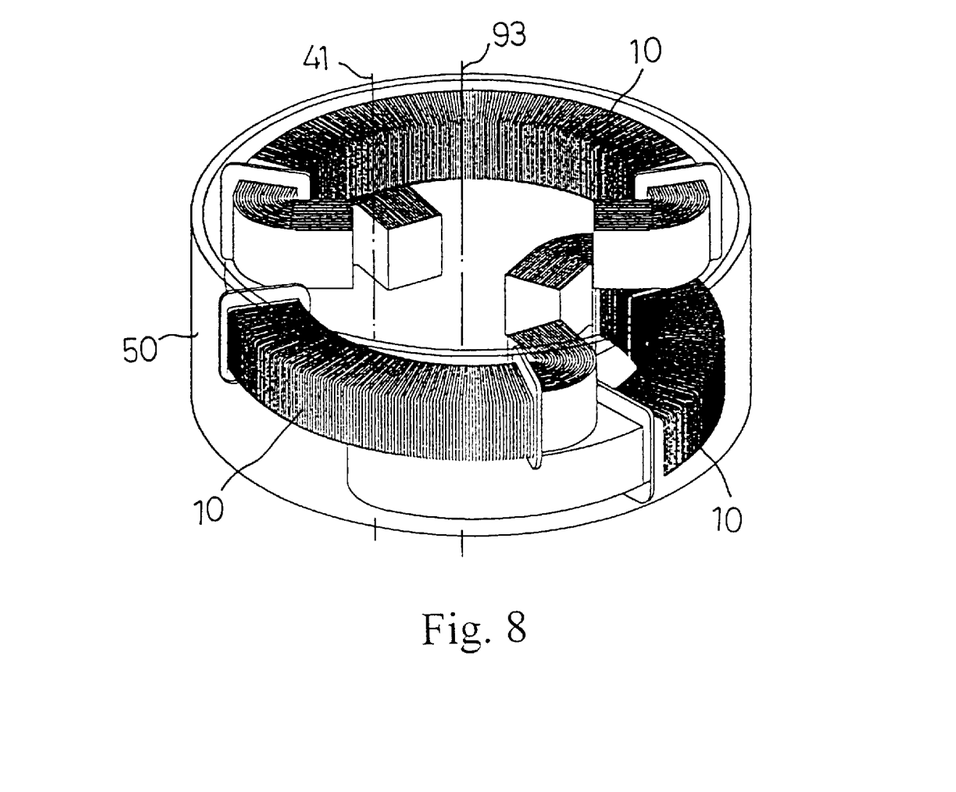
FIG. 8 is a perspective view of the stator according to the fourth embodiment of the present invention.

FIGS. 7 and 8 show still another alternate form of the present invention. According to this alternate form, the stator 90 is a 6-pole stator having three stator units 10 arranged into three layers spaced in the direction of the central axis 93, and there is a difference of elevation in the direction of the longitudinal axis 41 between each two adjacent stator units 10 (the stator unit 10 at each layer is provided at a different location relative to the longitudinal axis 41).

Figure 9:
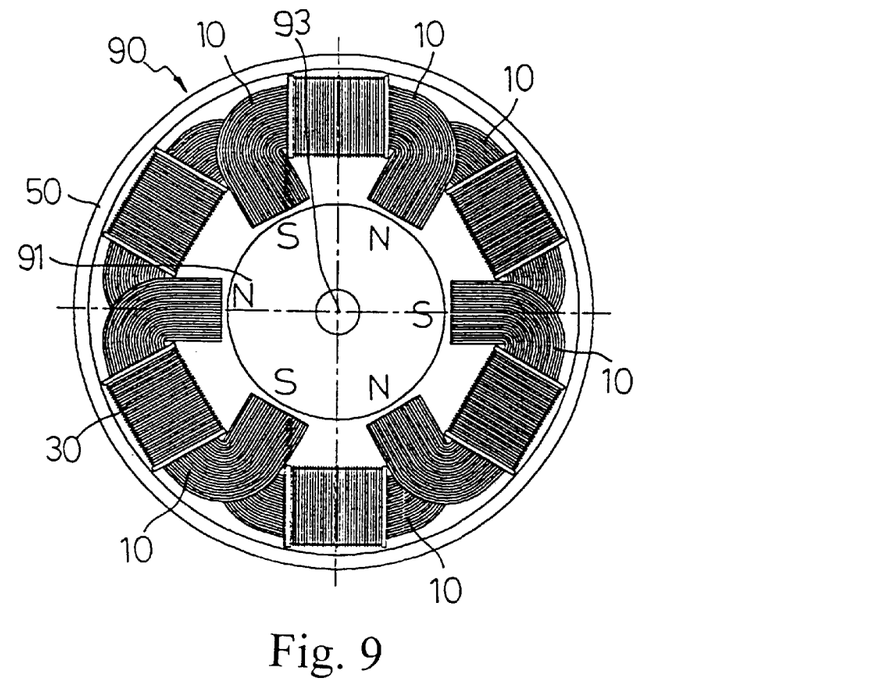
FIG. 9 is a sectional view of a stator according to a fifth embodiment of the present invention.
Figure 10:
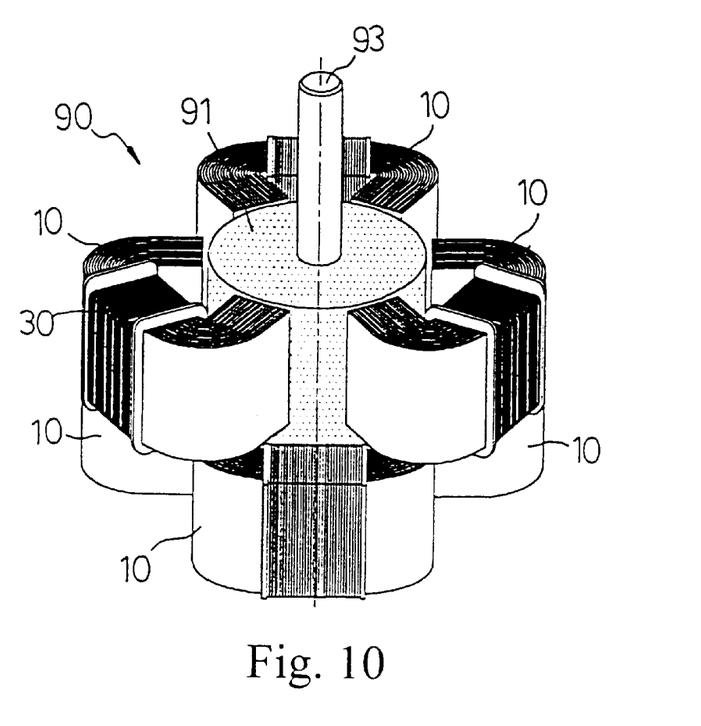
FIG. 10 is a perspective view of the stator according to the fifth embodiment of the present invention.

FIGS. 9 and 10 show still another alternate form of the present invention. According to this alternate form, the stator 90 is a 12-pole stator comprised of six stator units 10 arranged in two sets. The two sets of stator units 10 are spaced in the direction of the central axis 93, and staggered.

In the embodiments shown in FIGS. from 4 through 10, the longitudinal axis 41 is parallel to the central axis 93.

Figure 11:
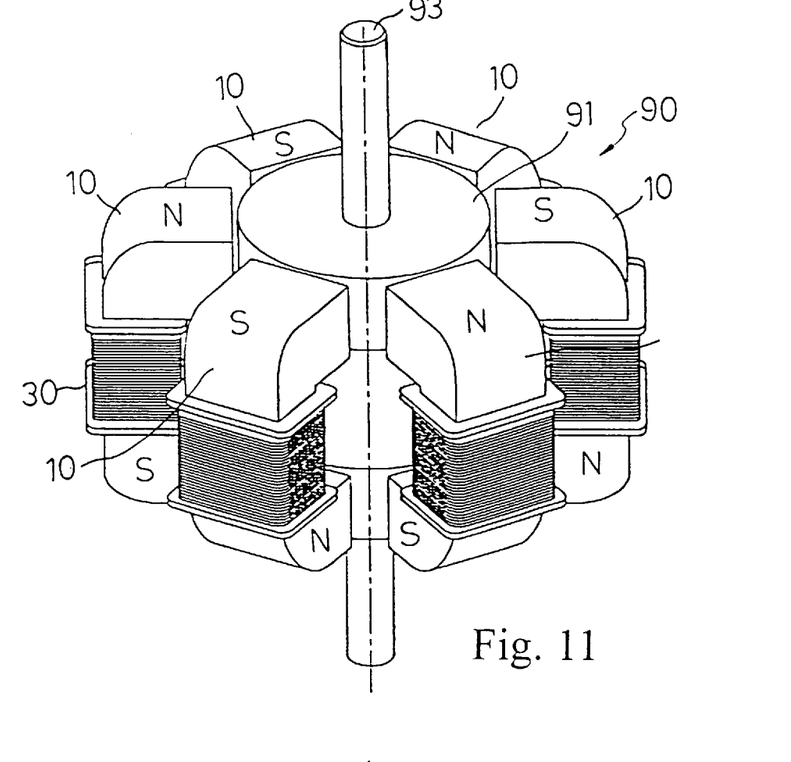
FIG. 11 is a perspective view of a stator according to a sixth embodiment of the present invention.
Figure 12:
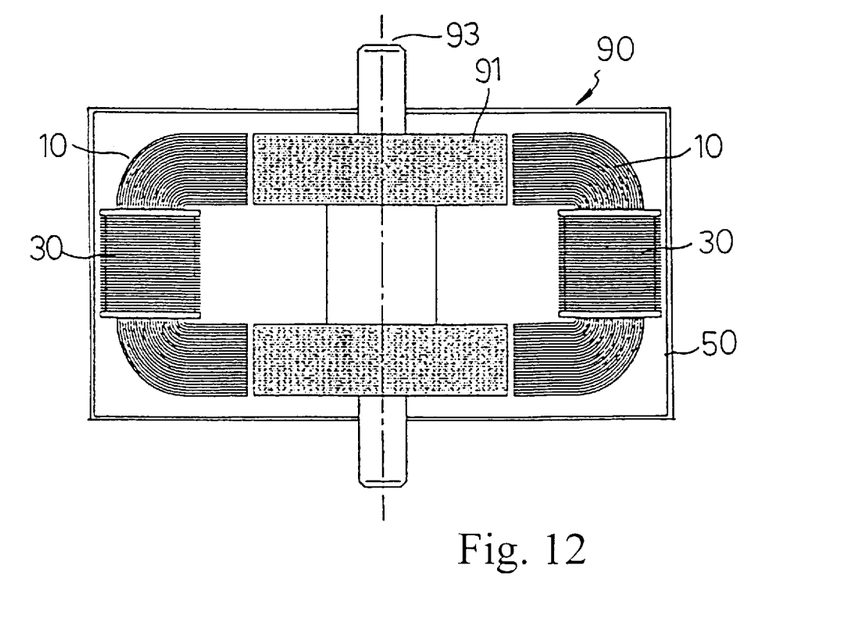
FIG. 12 is a sectional view of the stator according to the sixth embodiment of the present invention.
Figure 13:
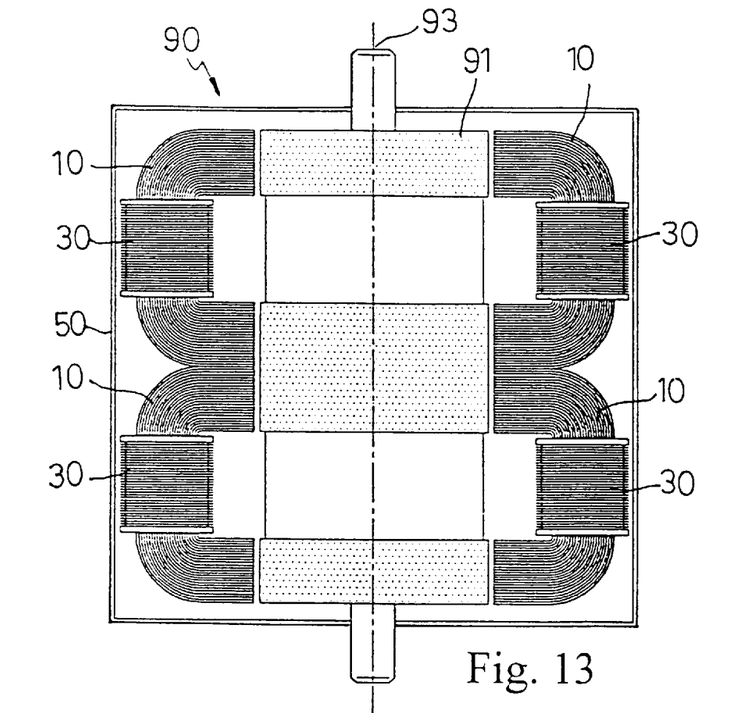
FIG. 13 is a sectional view of a stator according to a seventh embodiment of the present invention.
Figure 16:
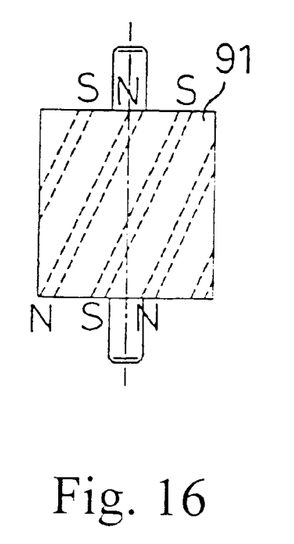
FIGS. 16 through 18 show three different forms of rotors according to the present invention.
Figure 17:
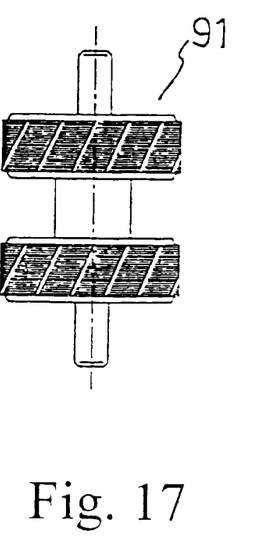
Figure 18:
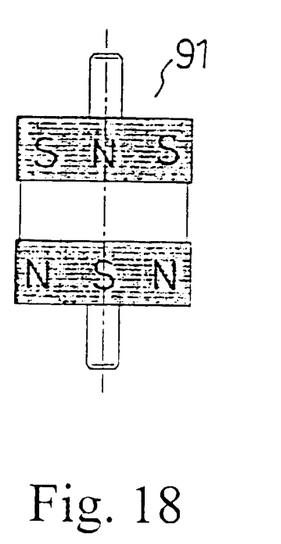

FIGS. from 11 through 13 show still other alternate forms of the present invention, in which the longitudinal axis 41 of each stator unit 10 respectively extends perpendicular to the central axis 93. In FIGS. 11 and 12, the rotor 91 is a 12-pole stator comprised of six stator units 10 spaced from one another at 60° around the central axis 93. In this case, the rotor 91 shown in FIG. 16, the rotor 91 shown in FIG. 17, or the rotor 91 shown in FIG. 18 may be used. In FIG. 16, the S poles and N poles of the rotor 91 are respectively extended in an oblique direction, and alternatively arranged in parallel. In FIG. 17, the rotor 91 is comprised of two vertically spaced aluminum cast stator elements (non-permanent magnets). In FIG. 18, the rotor 91 is comprised of two magnets vertically spaced in reversed directions. The embodiment shown in FIG. 13 is a two-layer design based on the embodiment shown in FIGS. 11 and 12, in which the stator elements 10 at the bottom layer and the stator elements 10 at the top layer are staggered (in FIG. 13, only the bottom layer stator elements 10 are shown).

Figure 14:
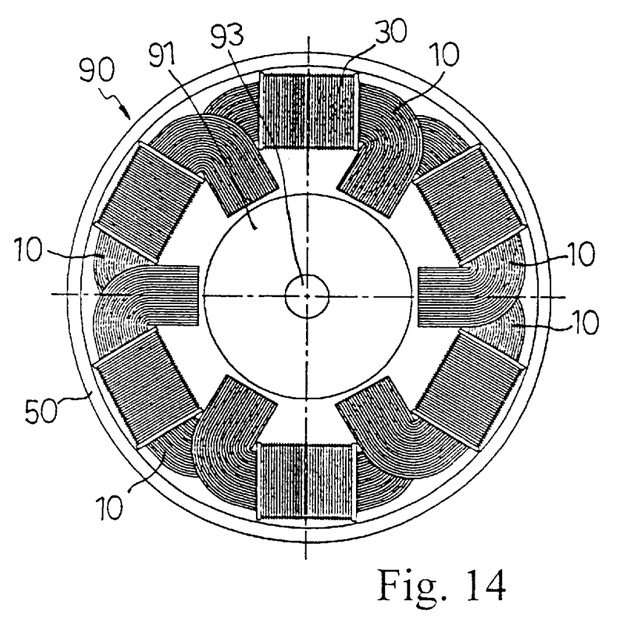
FIG. 14 is a sectional view of a stator according to an eighth embodiment of the present invention.
Figure 15:
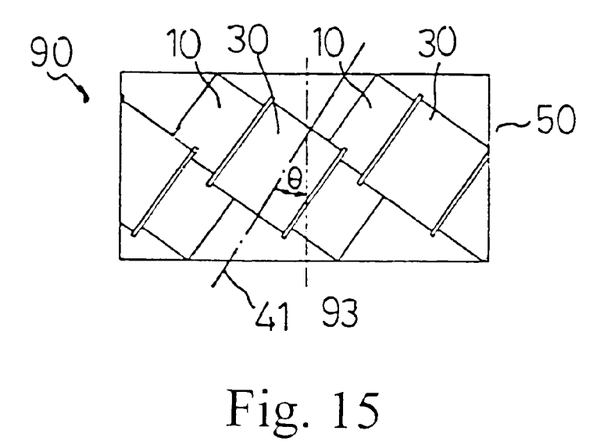
FIG. 15 is a perspective view of the stator according to the eighth embodiment of the present invention.

According to the alternate forms shown in FIGS. 14 and 15, the longitudinal axis 41 of each stator unit 10 defines with the central axis 93 a contained angle . This arrangement enables a relatively thicker winding 30 to be respectively wound round the column 19 of each stator unit 10.

Figure 19:
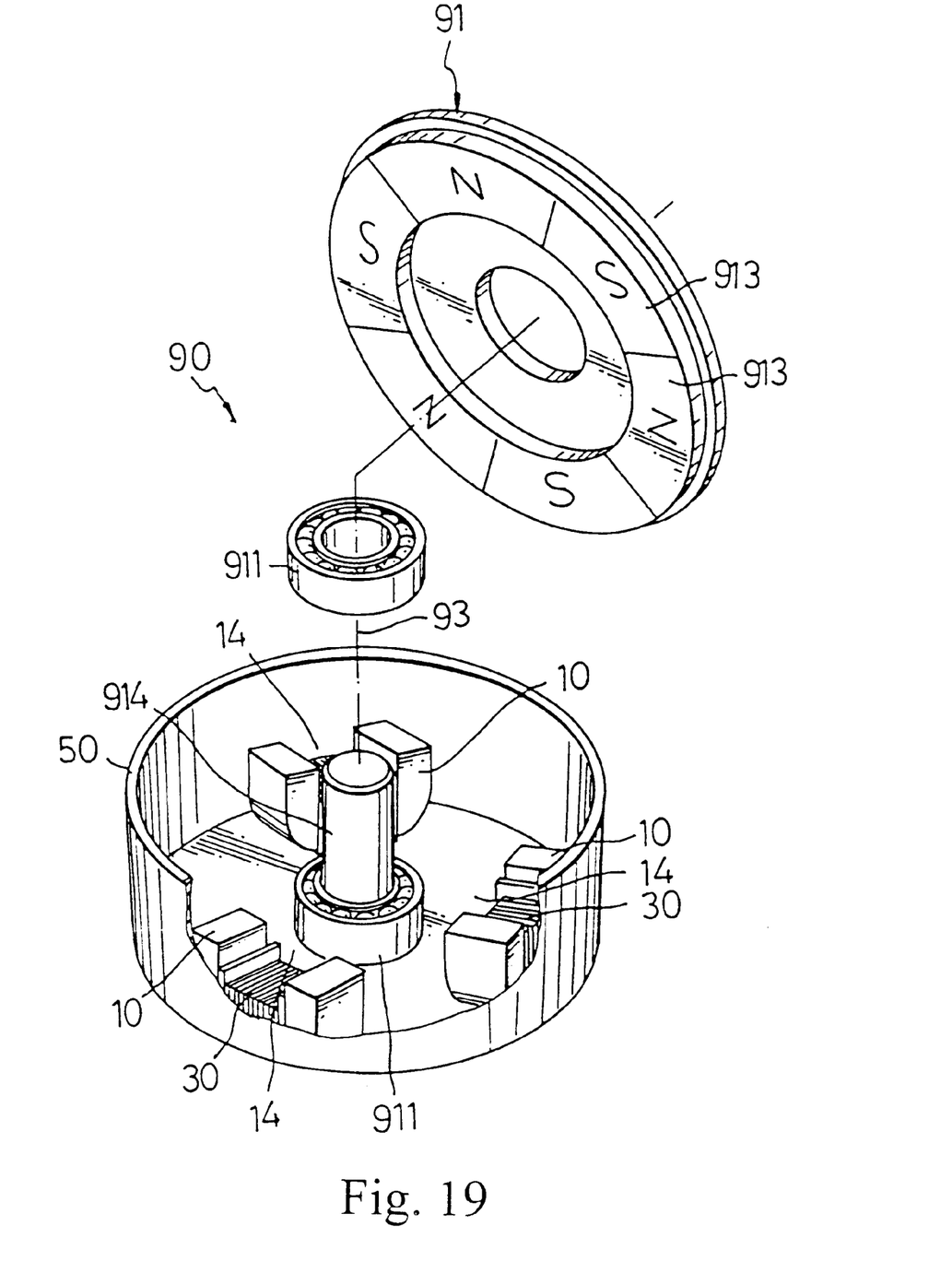
FIG. 19 illustrates a stator according to a ninth embodiment of the present invention.

FIG. 19 shows still another alternate form of the present invention, in which the stator 90 is a 6-pole stator comprised of three stator units 10 arranged in such a direction that the inner side 14 of each stator unit 10 is disposed in parallel to the longitudinal axis 41 of the respective stator unit 10, and the longitudinal axis 41 of each of the three stator units 10 respectively extends perpendicular to the central axis 93. In this case, the rotor 91 is shaped like a disk, and supported on a shaft 914 in locating means 50 by bearings 911. The rotor 91 comprises a plurality of magnets 913 (6 poles) arranged around the border. This arrangement enables the rotor 91 to be rotated on the shaft 914.

The aforesaid locating means 50 can be a shell, and the stator units 10 of the stator 90 are respectively fastened to the shell 50 on the inside by an adhesive, screw means, or a welding apparatus. Alternatively, the stator units 10 can be arranged on a rack, and then a plastic shell is molded on the stator units 10 and the rack.

It is to be understood that the drawings are designed for purposes of illustration only, and are not intended as a definition of the limits and scope of the invention disclosed.

What the invention claimed is:

1. An electro-motor or dynamo, comprising:
   (i) a plurality of stator units arranged around a central axis, said stator units each comprising:
      (a) a column, said column comprising a top side, a bottom side opposite to said top side, an inner side, an outer side opposite to said inner side, a first end section, a second end section, and a middle section connected between said first end section and said second end section, said column being extended longitudinally along a longitudinal axis from said top side toward said bottom side, said first end section and said second end section respectively formed integral with two distal ends of said middle section and turned toward said inner side; and
      (b) electrically conductive winding means wound round said column through multiple turns over said top side, said inner side, said bottom side, and said outer side; and
   (ii) locating means for holding said stator units fixedly together;
   (iii) the inner side of each of said stator units is respectively disposed facing said central axis;
   (iv) the longitudinal axis of each of stator units is respectively disposed perpendicular to said central axis; and
   (v) a rotor comprising two vertically spaced aluminum cast elements on a support member extending along said central axis.

2. The electro-motor or dynamo of claim 1 wherein said stator units are arranged into multiple layers spaced along said central axis.

3. The electro-motor or dynamo of claim 1 wherein said stator is comprised of six stator units equally spaced from one another at a 60° mechanical angle around said central axis.

4. The electro-motor or dynamo of claim 1 wherein the longitudinal axis of each of stator units passes through said central axis at an angle.

5. The electro-motor or dynamo of claim 1 wherein the longitudinal axis of each of said stator units is respectively disposed perpendicular to said central axis, and the inner side of the column of each of said stator units is respectively disposed in parallel to the central axis.

6. An electro-motor or dynamo, comprising:
   (i) a plurality of stator units arranged around a central axis, said stator units each comprising:
      (a) a column, said column comprising a top side, a bottom side opposite to said top side, an inner side, an outer side opposite to said inner side, a first end section, a second end section, and a middle section connected between said first end section and said second end section, said column being extended longitudinally along a longitudinal axis from said top side toward said bottom side, said first end section and said second end section respectively formed integral with two distal ends of said middle section and turned toward said inner side; and
      (b) electrically conductive winding means wound round said column through multiple turns over said top side, said inner side, said bottom side, and said outer side; and (ii) locating means for holding said stator units fixedly together;

(iii) the inner side of each of said stator units is respectively disposed facing said central axis;

(iv) the longitudinal axis of each of stator units is respectively disposed perpendicular to said central axis; and (v) a rotor comprising two vertically spaced magnets wherein said two permanent magnets having a plurality of permanent magnet poles being arranged in opposite polarities on a support member extending along said central axis.

7. The electro-motor or dynamo of claim 6 wherein said stator units are arranged into multiple layers spaced along said central axis.

8. The electro-motor or dynamo of claim 6 wherein said stator is comprised of six stator units equally spaced from one another at a 60° mechanical angle around said central axis.

9. The electro-motor or dynamo of claim 6 wherein the longitudinal axis of each of stator units passes through said central axis at an angle.

10. The electro-motor or dynamo of claim 6 wherein the longitudinal axis of each of said stator units is respectively disposed perpendicular to said central axis, and the inner side of the column of each of said stator units is respectively disposed in parallel to the central axis.

* * * * *